Inventors:
James P. Hollahan Jr.
James F. Kennedy

Patented Dec. 16, 1924.

1,519,682

UNITED STATES PATENT OFFICE.

JAMES P. HOLLAHAN, JR., AND JAMES F. KENNEDY, OF RANSOM, ILLINOIS.

DIRIGIBLE HEADLIGHT FOR MOTOR VEHICLES.

Application filed September 28, 1923. Serial No. 665,380.

*To all whom it may concern:*

Be it known that we, JAMES P. HOLLAHAN, Jr., and JAMES F. KENNEDY, citizens of the United States, and residents of Ransom, county of La Salle, and State of Illinois, have invented certain new and useful Improvements in Dirigible Headlights for Motor Vehicles, of which the following is a specification and which is illustrated in the accompanying drawings, forming a part thereof.

This invention relates to dirigible head lights and more particularly to dirigible head lights for motor vehicles.

One of the objects of the invention is the provision of new and improved mechanism for supporting the head lights of motor vehicles and that is adapted to direct the rays from the lights in the direction in which the vehicle is traveling.

Another object of the invention is the provision of a new and improved head light directing mechanism that is simple in construction, cheap to manufacture, easily assembled, efficient in operation and that is not likely to become broken or get out of order.

A still further object of the invention is the provision of head light operating mechanism that is in the nature of an attachment that is adapted to be applied to the motor vehicle without changing its construction or modifying the same in any way.

Other and further objects and advantages of the invention will appear from the following description taken in connection with the accompanying drawings, in which Fig. 1 is a plan view of the front portion of an automobile showing the invention in position thereon;

Figure 1:
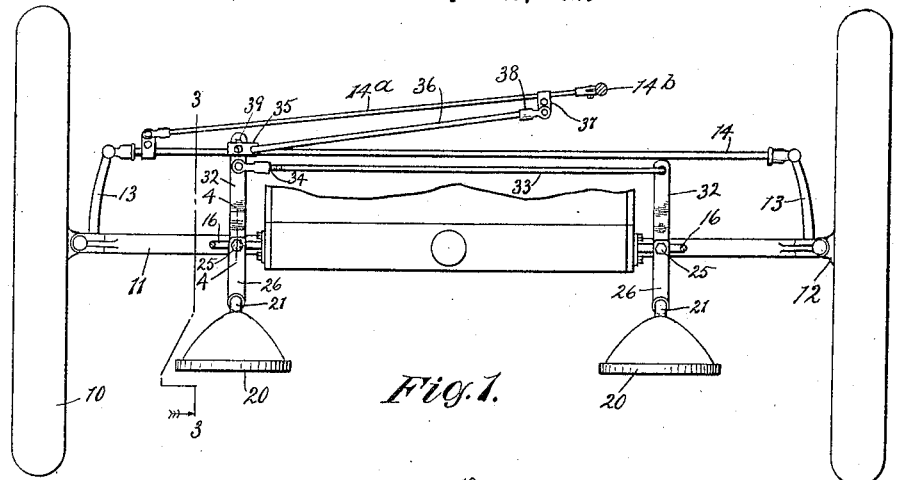
Figure 2:
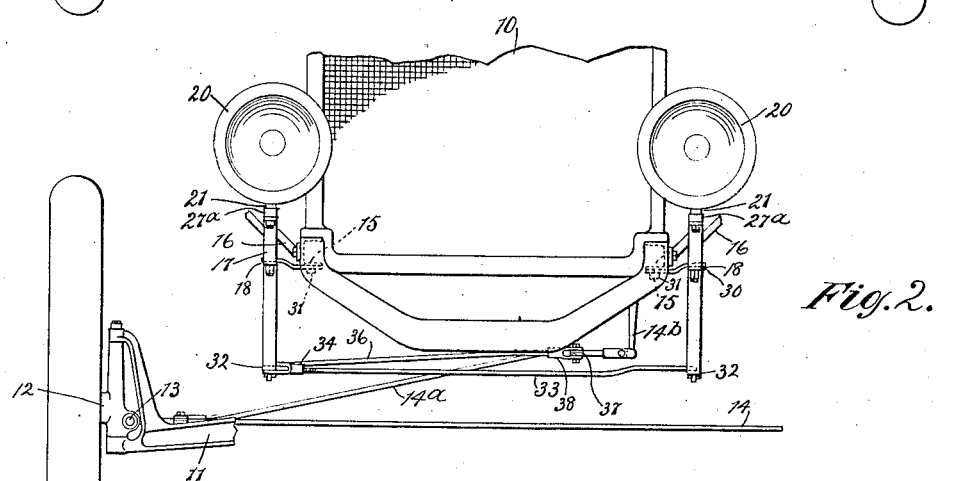
Fig. 2 is an elevation thereof with parts removed to more clearly show the application of the device.
Figures 3, 4:
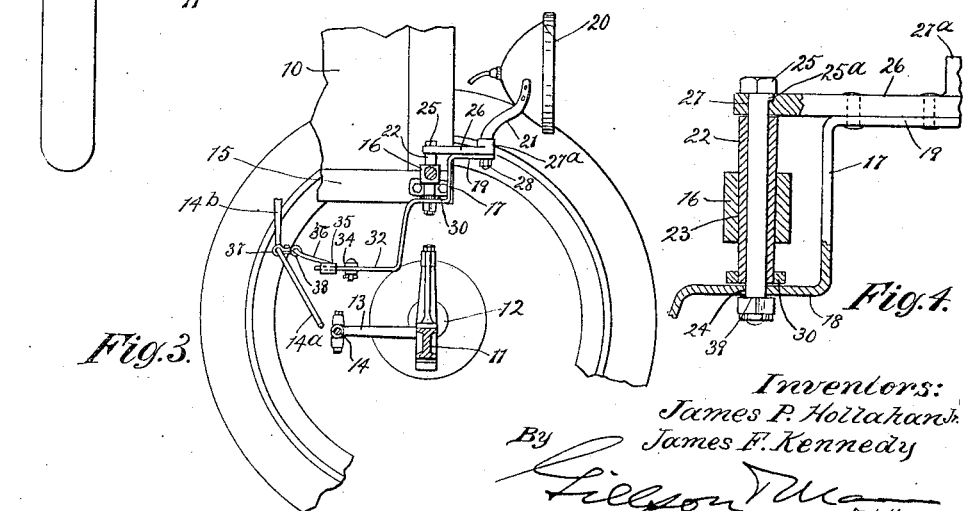
Fig. 3 is a cross section on line 3—3 of Fig. 1.
Fig. 4 is a cross section on line 4—4 of Fig. 1.

On the drawing, the reference character 10 designates an automobile comprising the front axle 11 to which is pivotally secured the spindles 12 in the usual manner. The spindles 12 are provided with the rearwardly extending steering knuckle arms 13 which are adapted to be connected together by the drag link 14. The steering gear connecting rod 14$^a$ connects the drag link 14 with the steering gear arm 14$^b$ as is usual in such constructions.

Mounted on the axle 11 is a chassis frame 15 at each side of which is secured the usual fender support and lamp bracket 16.

In traveling at night it is desirable that the rays from the headlight be directed at all times in the direction in which the vehicle is traveling. For this reason suitable means are provided for supporting the head lights and for moving the same to properly direct the rays of light therefrom. As shown, the headlights are mounted on suitable supports 17 which are adapted to be pivotally connected to the lamp brackets 16.

In the form of the device selected to illustrate one form of the invention, each support 17 comprises an angular body portion 18 to which is secured a forwardly extending supporting arm 19 on which is adapted to be mounted the headlight 20. The headlight 20 is provided with a supporting member 21 which is adapted to engage an opening in the forward end of the supporting arm 19 for supporting said light.

Suitable means are provided for pivotally securing the support to the bracket 16. As shown, a tapered sleeve 22 is adapted to be secured in the corresponding tapered opening 23 in the lamp bracket 16. The horizontal extension of the body portion 18 is adapted to extend beneath the sleeve 22 and is provided with an opening 24 for the reception of a bolt 25 extending through said sleeve for pivotally connecting the support 17 to said bolt.

A brace member 26 may be, and preferably is, connected at its forward end to the supporting arm or extension 19 and is provided at its rear end with an opening 27 for the reception of the bolt 25. The bolt 25 is preferably provided with a suitable projection 25$^a$ for engaging a corresponding recess in the member 26 whereby the bolt 25 will pivot in the sleeve 22 when the member 26 is oscillated. The forward end of the brace member 26 may be provided with a boss 27$^a$ having a tapered bore to receive the corresponding tapered end of the lamp support. The lamp support 21 is secured in position in the brace member 26 and supporting arm 19 by any suitable means such as the nut 28. The brace member 26 not only assists in supporting the head light but also prevents undue vibration of the same. An additional bracing member 30 may be secured on the lower end of the sleeve 22 and to the chassis frame 15 in any suitable manner as by means of the bolt 31.

Suitable means are provided for oscillating the supports 17. As shown, each support is provided with a downwardly and rearwardly extending portion forming a directing arm 32 to which the operating mechanism may be connected.

It is desirable that the two headlights be operated in unison and for this reason the directing arms 32 are secured together by means of a link 33 which is adapted to be pivotally connected to each of said arms. The link 33 is made in two sections connected together by the usual screw-threaded union 34 whereby the length of the link may be varied for adjusting the angularity of the headlights.

Suitable means are provided for causing the headlights to oscillate in unison with the operation of the steering mechanism whereby the rays therefrom will be automatically directed in the direction in which the vehicle is traveling. Any suitable mechanism may be provided for this purpose. As shown, one of the directing arms may be provided with a clip 35 to which an operating link 36 is adapted to be pivotally connected. It is desirable that the link 36 be so connected to the steering mechanism that it will not be necessary to compensate for the relative movement between the frame and axle. For this reason the link 36 is connected to the rod 14$^a$ by means of a clip 37 which is clamped on said rod in proximity to said steering arm 14$^b$. The link 36 may, if desired, be adjustable as to length by threading the same in the end of the connector 38 in the usual manner.

The attachment is a single unit and in attaching the same ot an automobile it is only necessary to pivotally connect the supports to the lamp brackets or the like and connect the operating link to the steering mechanism.

In applying the attachment to one well known type of automobile the headlights are removed from the brackets 16 and are secured in the openings in the ends of the forwardly extending arms of the supports. The supports are pivotally connected to the brackets 16 by means of the sleeves 22 and bolts 25. The sleeves 22 which are slightly tapered are driven in the openings 23 in the brackets 16 and the bolts 25 are passed through the openings 27, the sleeves 22 and the body portions 18 of the supports.

The link 36 is now connected to the drag rod 14$^a$ of the steering mechanism. In order to vary the extent of oscillation of the headlights the arm 32 may be provided with additional openings 39 whereby the clip 35 may be adjusted along the same.

While the attachment is shown as being applied to one type of automobile, it is understood that the invention is not so limited as the same may be applied to other types without departing from the spirit of the invention as defined in the appended claims.

We claim as our invention:

1. In a device of the class described, a pair of lamp supports, pivot members intermediate the ends of said supports, said pivot members comprising elongated sleeves adapted to be rigidly secured to the lamp brackets of a motor vehicle, and pivot pins for securing said supports to said sleeves, means for securing a light to the forward ends of said supports, means for connecting the rear ends of said supports together, and means for oscillating said supports from the steering mechanism of a motor vehicle.

2. In a motor vehicle having steering mechanism and provided with lamp brackets at each side thereof, a bearing secured in each of said brackets, lamp supports journaled in said bearings, lamps carried by said supports, and means connecting said supports to said steering mechanism for operating the same.

3. In combination with a vehicle having lamp brackets secured thereto and each provided with an opening therethrough, bearing sleeves rigidly mounted in said openings and extending a substantial distance above and below said brackets, steering mechanism for said vehicle, supports having a supporting and a directing arm rigidly secured thereto, headlights secured to said supporting arms, means for pivotally supporting said supports on said sleeves, means for bracing said supports from said vehicle and means for operating said directing arms from said steering mechanism.

4. An attachment for vehicles, comprising a pair of supports, each having an angular body portion and forwardly and rearwardly extending arms a brace member secured to said forwardly extending arm and extending rearwardly parallel with and in spaced relation to the lower section of said body portion, said brace being provided with an aperture at each end thereof in alinement with apertures in said body portion, a sleeve between the rear end of said brace and said body portion, a bolt for connecting said brace and body portion together, a link for connecting the ends of said rearwardly extending arms, and means for operating said last named arms from the steering mechanism of a motor vehicle.

5. In combination, a pair of lamp supports, each bent to form a body member and forwardly and rearwardly extending arms, said body member comprising a horizontal and a vertical portion, said horizontal portion being provided with an aperture, a brace member secured to said forwardly extending arm and extending rearwardly therefrom and provided with an aperture in its rear end in alinement with the aperture in the horizontal portion, a bearing sleeve interposed between said horizontal portion and the rear end of said arm and adapted to be rigidly secured in an aperture in a lamp bracket, a pin extending through said apertures and said sleeve for pivotally connecting said support to said sleeve, and means for operating said rearwardly extending arms in unison from the steering mechanism.

JAMES P. HOLLAHAN, Jr.,
JAMES F. KENNEDY.